Figure 1:
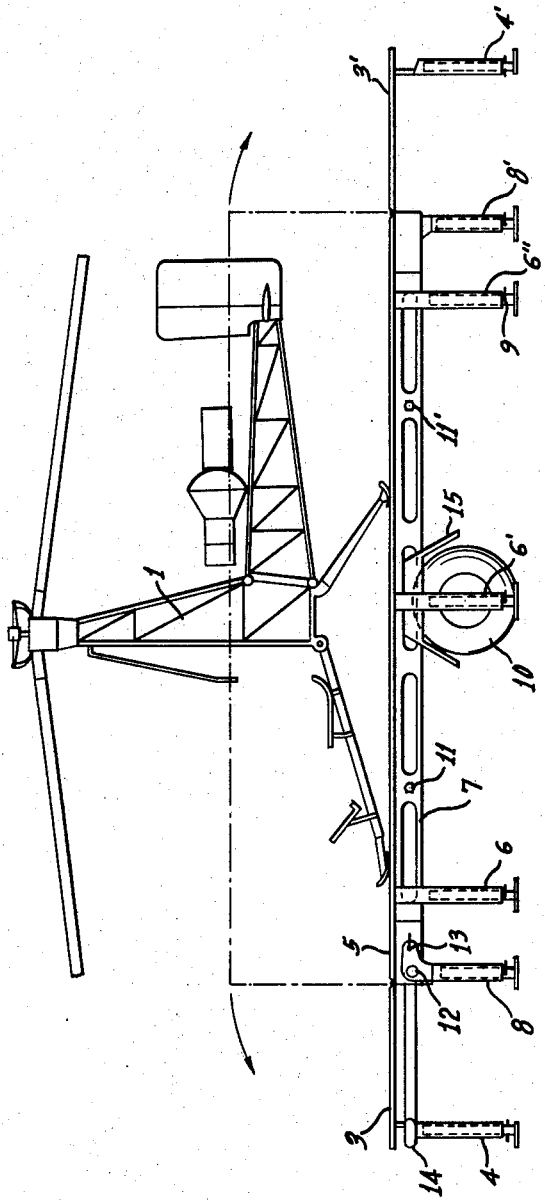

Sept. 8, 1964

T. LAUFER 3,147,940

PORTABLE HELIPORT AND TRANSPORTING VEHICLE
FOR A FOLDABLE HELICOPTER

Filed Oct. 7, 1963

2 Sheets-Sheet 1

INVENTOR.
THEODOR LAUFER

BY

*James E. Bryan*

ATTORNEY

Sept. 8, 1964

T. LAUFER 3,147,940

PORTABLE HELIPORT AND TRANSPORTING VEHICLE
FOR A FOLDABLE HELICOPTER

Filed Oct. 7, 1963

2 Sheets-Sheet 2

INVENTOR.
THEODOR LAUFER

BY James E. Bryan
ATTORNEY

3,147,940
PORTABLE HELIPORT AND TRANSPORTING VEHICLE FOR A FOLDABLE HELICOPTER

Theodor Laufer, Friedrichshafen, Germany, assignor to Dornier-Werke, G.m.b.H., Friedrichshafen (Bodensee), Germany, a corporation of Germany
Filed Oct. 7, 1963, Ser. No. 314,128
Claims priority, application Germany, Nov. 3, 1962, D 40,185
7 Claims. (Cl. 244—114)

Due to the nature of light helicopters, in many cases they can not be flown to various places where they are to be used but must be transported from place to place by some other means. There are a number of reasons for this, for example geographical conditions, such as mountains or large distances to be covered, or weather conditions. Accordingly, it has been proposed to construct light helicopters in a manner such that, after removal of certain bulky individual parts thereof, their dimensions are substantially reduced so they can be packed and transported.

From experience with gliders, it is known to disassemble the aircraft, for example, to completely remove the wings and tail assembly and then place them alongside the fuselage. The fuselage and the wings then are placed on a special trailer and secured thereto. The individual parts must, upon assembly and disassembly, be individually removed from the trailer or packed onto it, respectively. A similar partial dismantling has been utilized in the case of helicopters also. In such procedure, the rotor blades and the entire rotor head are removed and packed separately from the rest of the helicopter, for transportation in an aircraft or the like.

In this case also, the assembly and disassembly as well as the packing of the individual parts is inconvenient. Further, auxiliary apparatus such as a working platform and a crane are necessary for this purpose and this auxiliary apparatus must be transported together with the helicopter.

It has been proposed to construct a light helicopter in a manner such that it can be folded without the necessity for disassembling it. In such case, the fuselage is disassembled into two main parts, i.e., the rotor support and the tail assembly support. These two parts can be so folded about a pivot that, in folded position, there is provided an elongated structure against which the other protruding parts of the helicopter can be swung down without it being necessary to completely disconnect them from the fuselage.

The present invention relates to a portable heliport and transporting vehicle for such a foldable light helicopter which greatly simplifies the transportation and packing of the aircraft. The transporting vehicle is an enclosure or box mounted on a trailer. After removal of the cover from the enclosure or box, the walls of the box or enclosure can be laterally swung down and supported in a substantially horizontal position, whereby a flat platform is formed, together with the bottom of the enclosure or box. This platform forms a working and operating platform from which the helicopter can be flown and upon which it can be landed. One advantage of the invention resides in the fact that the individual parts need not be first unloaded from the trailer, as is the case in the transportation of gliders, in order to assemble them and make them ready for take-off, but assembly, take-off, and landing can be effected directly from the trailer itself.

Figure 2:
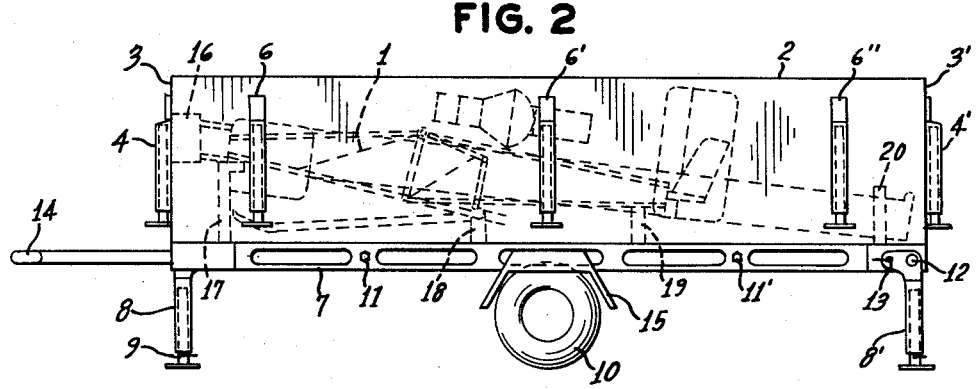
Figure 3:
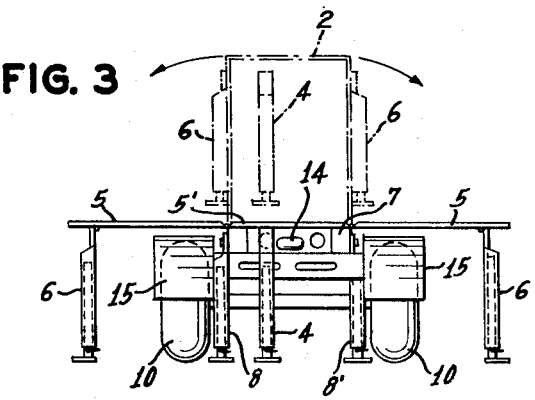
Figure 4:
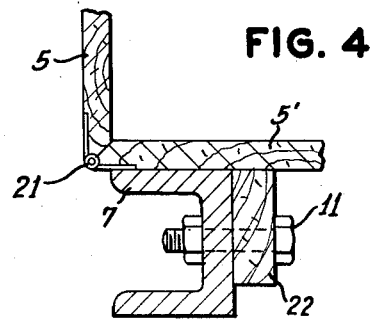

One embodiment of the invention is disclosed in the accompanying drawings, in which corresponding parts have the same reference numerals, and in which:

FIGURE 1 is a view in elevation of the portable heliport and transporting vehicle as it appears during flight operations, FIGURE 2 is a view in elevation of the device of FIGURE 1 with the helicopter folded and enclosed within the box, FIGURE 3 is a front view of the device of FIGURE 1 with the helicopter removed, and FIGURE 4 is a fragmentary detailed view showing the fastening means of the box or enclosure to the trailer.

The transporting vehicle comprises a chassis or frame 7 which, in the embodiment shown, has a single axle and the two wheels 10. If desired, conventional fenders 15 can be mounted over the wheels 10. The dimensions of the enclosure or box mounted on the chassis 7 are such that when the walls are swung downwardly into the operating position, there is no interference with the wheels 10 or the fenders 15. The chassis or frame also has a conventional tongue and trailer coupling 14 connected thereto. A plurality of swingable supports 8 and 8′ are mounted on the chassis and support the chassis against the ground. The swingable supports are mounted on the pivots 12 and have the locking devices 13 for locking them in the vertical position. In the embodiment shown in the drawings, only one such support is shown at the front and rear of the chassis although any number of such supports may be employed as desired. The enclosure or box for the helicopter is mounted on the chassis 7, and, as shown in FIGURE 4, the enclosure is connected to the frame by detachable connections such as the bolt 11 which passes through the lug 22 on the bottom 5′ of the enclosure or box. As a result of this connection, the box or enclosure can, at any time, be removed from the chassis and transported by some other means. Also shown in FIGURE 4 is the hinge 21 which connects the swingable side wall 5 of the box to the stationary bottom 5′. Such hinges are provided on all of the four walls of the enclosure or box.

FIGURE 2 shows the transporting vehicle with the box or enclosure in the closed position. The folded helicopter 1 and the supporting and securing devices therefor 16 to 20 are indicated in phantom. Also, the swingable supports 4 and 4′ on the end walls 3 and 3′ and the supports 6, 6′, and 6″ on the side wall 5 are shown.

In setting up the helicopter for flight operations, the lid 2, which is fastened to the walls by rapid closure devices, is first removed. After disconnecting rapid closure devices (not shown) between the end and side walls, the end walls 3 and 3′ can be swung downwardly in the direction of the arrows shown in FIGURE 1. In the corresponding manner, the side walls 5 are also swung downwardly in the direction of the arrows shown in FIGURE 3. The aforementioned supports 4, 4′, 6, 6′, and 6″ are vertically adjusted in accordance with the condition of the terrain, using a conventional adjusting device such as the vertically adjustable pin 9, so that the end and side walls together with the stationary bottom 5′ of the enclosure form a flat surface which serves as a working platform and a take-off and landing platform for the helicopter.

In FIGURE 1, the helicopter is shown in position ready for take-off. The supporting and securing devices 16 to 20 for the folded helicopter, indicated in phantom in FIGURE 2, are removable from the walls and bottom of the enclosure, respectively, so they do not interfere with the assembly or flight operations of the helicopter.

The invention provides a simple transporting vehicle for a foldable light helicopter which vehicle also serves as a working platform for readying the helicopter for flight operations. The helicopter itself need not be removed from its place on the vehicle or taken out of the box or enclosure. Rather, the helicopter is made ready for flight operations in position on the vehicle and is also flown from the same point.

Landing and packing up of the helicopter are also facilitated since the pilot can land the helicopter on the open platform and, at most, a slight change of position will be necessary in order to have the helicopter exactly in the position in which it is to be folded and placed in the box or enclosure. Since the box is detachable from the chassis, there is at all times the possibility of placing the helicopter into some other means of transportation without unpacking it. For example, the packed helicopter may be placed in an aircraft for transport. In this latter case also, the open box serves simultaneously as a working platform and a platform for flight operations.

It will be obvious to those skilled in the art that many modifications may be made within the scope of the present invention without departing from the spirit thereof, and the invention includes all such modifications.

What is claimed is:

1. A portable heliport and transporting vehicle for a foldable light helicopter comprising an enclosure mounted on a trailer, the enclosure having a removable top and laterally-swingable walls, and means for supporting the walls in substantially horizontal position, whereby a platform of increased area is formed.

2. A portable heliport and transporting vehicle according to claim 1 in which removable supporting and securing means for the helicopter are mounted on the walls of the enclosure.

3. A portable heliport and transporting vehicle according to claim 1 in which the means for supporting the walls in substantially horizontal position are swingably mounted on the walls.

4. A portable heliport and transporting vehicle according to claim 1 in which supports are swingably mounted on the trailer.

5. A portable heliport and transporting vehicle according to claim 3 in which the supporting means are adjustable in height.

6. A portable heliport and transporting vehicle according to claim 4 in which the supports are adjustable in height.

7. A portable heliport and transporting vehicle according to claim 1 in which the enclosure is removable from the trailer.

References Cited in the file of this patent
UNITED STATES PATENTS 1,770,675    Short _____ July 15, 1930

FOREIGN PATENTS 469,554    Great Britain _____ Jan. 23, 1936